United States Patent [19]

Horgan et al.

[11] Patent Number: 5,419,048
[45] Date of Patent: May 30, 1995

[54] CUTTING TOOL

[76] Inventors: Terence P. Horgan, 54b Coode Street, Maylands, Western Australia, Australia, 6051; Jan L. Roth, 1 Cumberland Road, Forrestfield, Western Australia, Australia, 6058

[21] Appl. No.: 231,048

[22] Filed: Apr. 22, 1994

[51] Int. Cl.⁶ ............................................. B26B 13/06
[52] U.S. Cl. ...................................... 30/258; 30/254
[58] Field of Search ............................... 30/254–262, 30/210, 228

[56] References Cited

U.S. PATENT DOCUMENTS

| | | | |
|---|---|---|---|
| 1,201,106 | 10/1916 | Sluter | 30/258 |
| 2,934,822 | 5/1960 | Docken | 30/258 |

FOREIGN PATENT DOCUMENTS

| | | |
|---|---|---|
| 134959 | 10/1946 | Australia . |
| 17319 | 7/1983 | Australia . |

*Primary Examiner*—Douglas D. Watts
*Attorney, Agent, or Firm*—Dennison, Meserole, Pollack & Scheiner

[57] ABSTRACT

A three bladed cutting tool (10) with a middle blade (16) provided between the other two blades (12,14). The middle blade (16) is pivotal relative to the other two blades (12,14). A thin ribbon of swarf (102) is removed from the sheet material (100) in a cutting operation. The cutting tool (10) discharges this swarf (102) from the cutting zone in a direction substantially transverse to the cutting direction. An angled cutting edge (68, 68') on the middle blade (16) directs the swarf (102) out through an opening (72) provided in at least one of the other two blades (12,14).

9 Claims, 5 Drawing Sheets

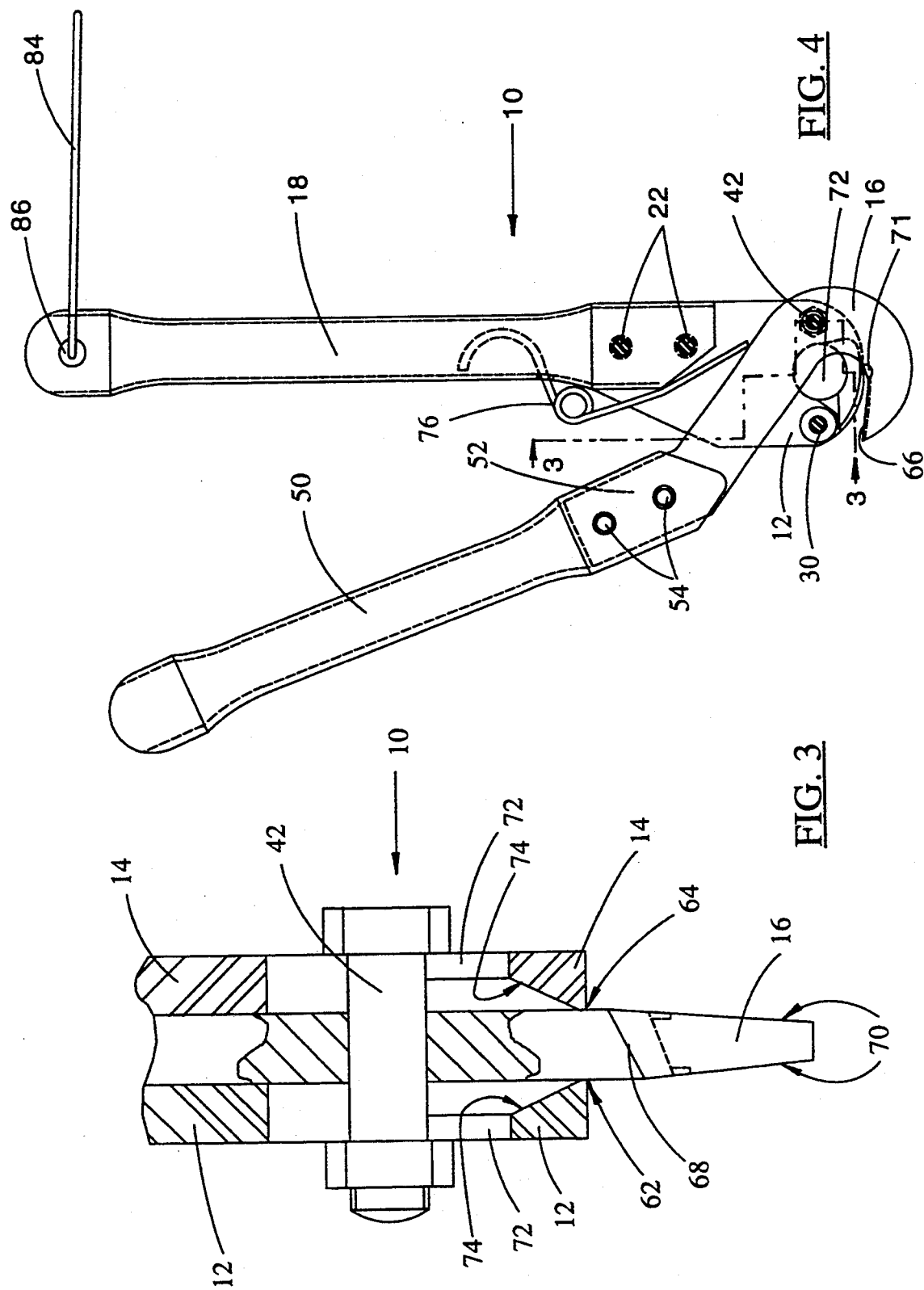

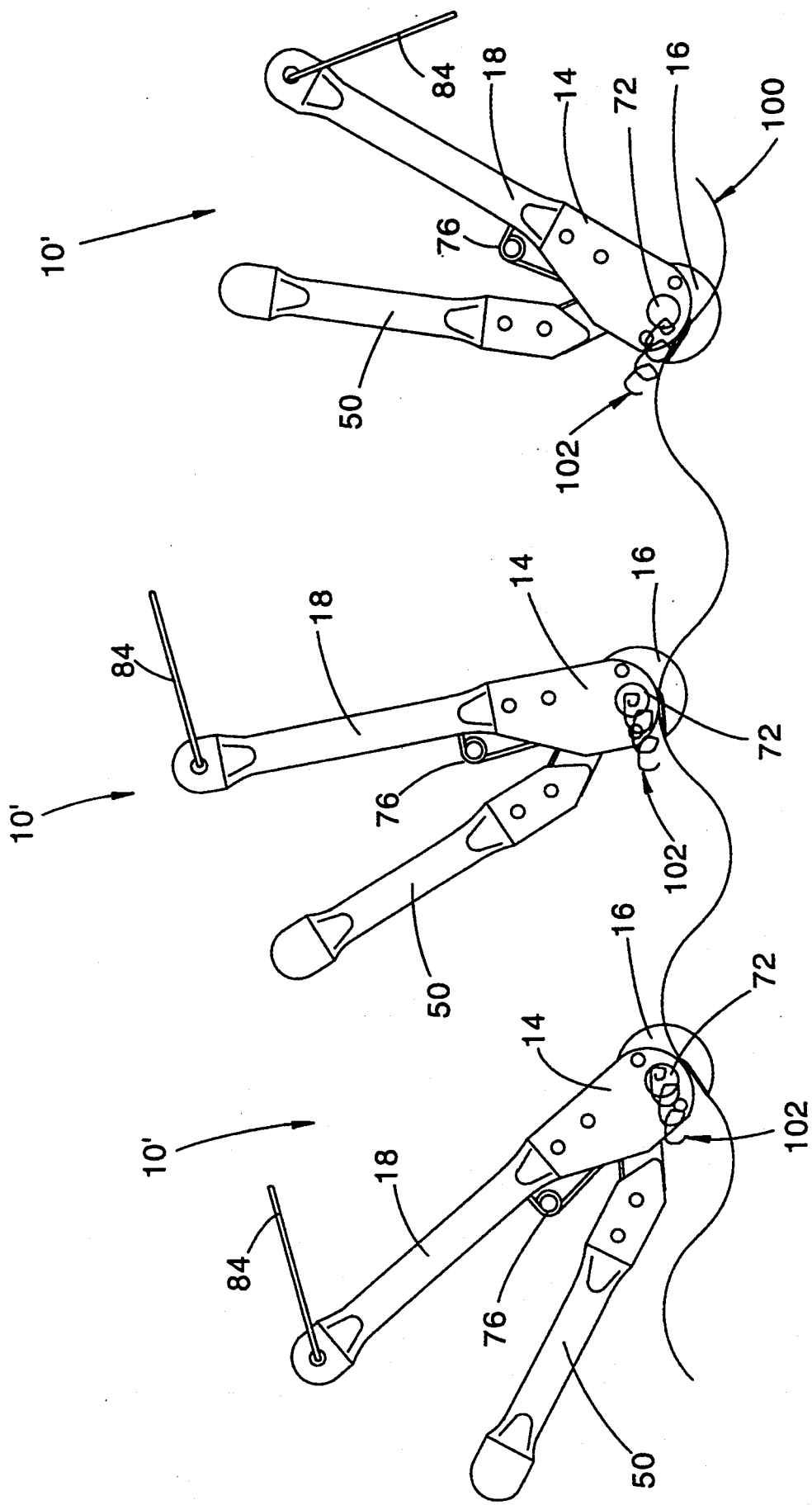

CUTTING TOOL

BACKGROUND OF THE INVENTION

The present invention relates to a cutting tool.

The cutting tool of the present invention may be used for cutting sheet material including corrugated sheet material, particularly sheet metal and plastics sheeting. In the cutting operation, the cutting tool of the present invention removes a thin ribbon of swarf from the material being cut by the cutting action of its three blade members. Prior art three bladed cutting tools suffer from the drawback that the cutting operation produces an uncontrolled ribbon of swarf of large diameter which exits from the front of the cutting tool and back into the immediate path of the curing direction of the cutting tool and the hands of the operator holding the cutting tool. This slows down the cutting operation since time must be spent removing the unwanted swarf from the cutting tool's cutting path so that the cutting tool can be advanced and also to provide a safer area for the cutting tool to work in. Further, the uncontrolled ribbon of swarf is apt to re-enter the cutting zone between the cutting blades thereby fouling the cutting tools cutting ability. Additionally, prior art three bladed cutting tools do not address the problem of keeping the cutting angle between the cutting edges on the middle cutting blade and the outer cutting blades constant through the cutting operation. This results in the material to be cut slipping forwards on commencement of the cut and the cut is inefficiently performed at the end of a cut thereby slowing down the speed and continuity of the cutting operation. In some prior art cutting tools a single cutting action produces a single small piece of swarf with the possibility of the swarf jamming the cutting blades due to it not being ejected cleanly which also results in the pieces of swarf that follow fouling up. This means that time is spent unblocking the fouled swarf.

A further problem encountered with many prior art three bladed cutting tools is that they are unable to cut across corrugated sheet material. The reason for this is that their handles will interfere with the corrugations on the upside cutting direction.

BRIEF SUMMARY OF THE INVENTION

The present invention seeks to provide a cutting tool in which the swarf is directed away from the cutting zone such that it does not interfere with the further cutting operation. In accordance with one aspect of the present invention there is provided a cutting tool comprising first, second and third blade members, said third blade member provided between said first and second blade members and pivotal relative to said first and second blade members, and means for discharging swarf removed from material cut during a cutting operation, wherein said means for discharging swarf discharges said swarf away from the cutting zone in a direction substantially transverse to the cutting direction.

BRIEF DESCRIPTION OF THE DRAWINGS

FIG. 3 is a partly cross-sectional elevation view taken along the line 3—3 in FIG. 4;

FIG. 4 is a side elevation view of the cutting tool shown in FIG. 1 with one of the (outer) blade members removed;

FIGS. 7a–7c show sequential views of the cutting tool shown in FIG. 5 in its cutting operation of corrugated sheeting.

DETAILED DESCRIPTION

Figure 1:
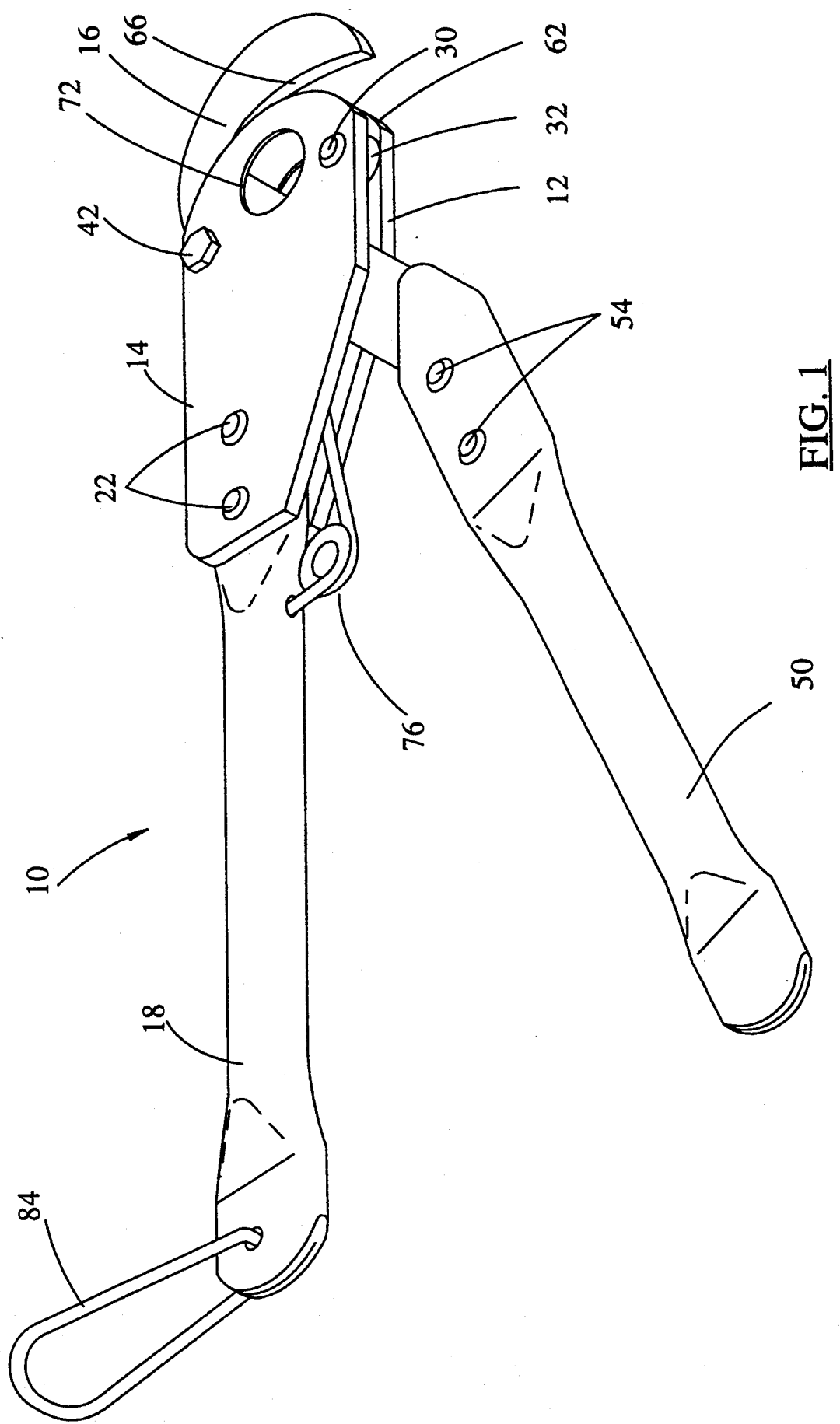
FIG. 1 is a first perspective view of a first embodiment of a cutting tool in accordance with the present invention.

In FIGS. 1 to 4 of the drawings there is shown a cutting tool 10 comprising a first blade member 12, a second blade member 14 and a third blade member 16. The third blade member 16 is provided between the first and second blade members 12 and 14.

The first and second blade members 12 and 14 are of similar shape and are opposed to one another in face to face registration.

A handle 18 having a flattened end portion 20 has the flattened end portion 20 sandwiched between the first and second blade members 12 and 14. The first and second blade members 12 and 14 and the handle 18 are secured together. This may be done by rivets 22 extending through holes 24, 26 and 28 in the first and second blade members 12 and 14, and the flattened end portion 20 ( of the handle 18), respectively.

A spacing pin 30 is provided between the first and second blade members 12 and 14. The spacing pin 30 comprises a spacing disc 32 in its mid region with short pins 34 and 36 extending from respective sides of the spacing disc 32.

The spacing disc 32 lies between the first and second blade members 12 and 14 and the short pins 34 and 36 locate in holes 38 and 40 of the first and second blade members 12 and 14, respectively.

The third blade member 16 is pivotal relative to the first and second blade members 12 and 14. This may be effected by a pivot pin 42 extending through holes 44, 46 and 48 in the first, second and third blade members 12, 14 and 16, respectively, secured by a nut 42a.

A second handle 50 has a slotted opening (obscured) which receives the shank end 52 of the third blade member 16, best seen in FIG. 4. The shank end 52 is secured in the second handle 50 by rivets 54 extending through holes 56 and 58 in the second handle 50 and the shank end 52 ( of the third blade member 16), respectively. The first and second blade members 12 and 14 are maintained at a fixed spacing by the spacing disc 32 of the spacing pin 30, flattened end portion 20 of the handle 18 and the pivot pin 42. The spacing disc 32, the flattened end portion 20 and length of the pivot pin 42 between the inner faces 60 of the first and second blade members 12 and 14 are each substantially equal to the thickness of the third blade member 16 plus twice the recommended cutting clearance for .mild steel. This allows a clearance between the first and third blade members 12 and 16 and the second and third blade members 14 and 16.

The first and second blade members 12 and 14 are provided with cutting edges 62 and 64, respectively.

The first and second blade members 12 and 14 are secured to the handle 18 near their ends spaced from their respective cutting edges 62 and 64.

The spacing pin 30 and the pivot pin 42 are provided near the ends of the first and second blade members 12 and 14 that carry the cutting edges 62 and 64. The spacing pin 30 is provided near first ends of the cutting edges 62 and 64 and the pivot pin 42 is provided near their second ends.

Figure 2:
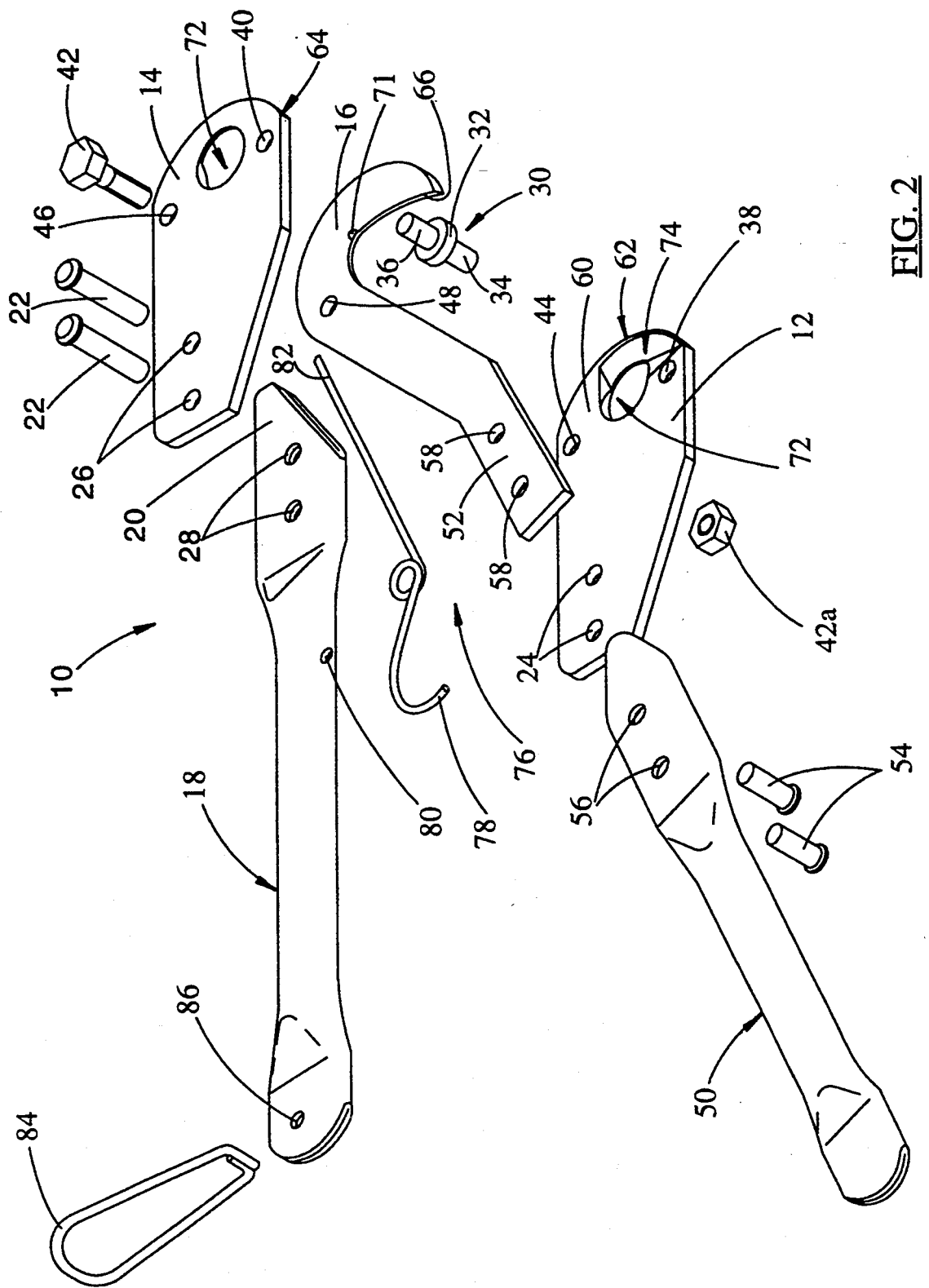
FIG. 2 is a second, exploded view of the cutting tool shown in FIG. 1.

The third blade number 16 is provided with a cutting edge 66. The cutting edge 66 is angled in its transverse direction as best seen in FIG. 3 at reference number 68. The third blade member 16 is of substantially hook shape, as best seen in FIGS. 2 and 4. The cutting edge 66 of the third blade member 16 is provided at the inner side of the hook shape such that it faces the cutting edges 62 and 64 of the first and second blade members 12 and 14. The third blade member 16 tapers from the inner edge of its hook shape (where its cutting edge 66 is located) to its outer edge, as best seen in FIG. 3 at reference numeral 70. Its outer edge is concave.

The third blade member 16 is provided with a notch 71 on each side at the start of its cutting edge 66 remote from its tip. These notches 71 remove the sharp edges between the first and second and third blade members 12, 14, 16 after advance in a cutting operation, thereby preventing snagging.

Preferably, the cutting edges 62, 64 and 66 of the first, second and third blade members 12, 14 and 16, respectively, are curved. This enables the cutting tool 10 to be used to cut corrugated sheeting. The cutting edges 62 and 64 of the first and second blade members 12 and 14 are convex curved and the cutting edge 66 of the third blade member 16 is concave curved.

The curvature of the cutting edge 66 of the third blade member 16 corresponds to and cooperates with the curvature of the cutting edges 62 and 64 of the first and second blade members 12 and 14 to produce a cutting action with a constant cutting angle between the cutting edges 66 and 62, 64 of the third blade member 16 and the first and second blade members 12 and 14, respectively. This makes the cutting tool 10 suitable for cutting internal and external curves and straight lines in sheet metal, corrugated sheets of curved and angular profile and the like in metal and plastics materials.

At least one of the first and second blade members 12 and 14 is provided with an opening 72 for exit of swarf. (In the drawings both the first and second blade members 12 and 14 are shown as provided with an opening 72.)

In the drawings the openings 72 are shown as round. This is because the cutting edges 62, 64 and 66 are curved. If the cutting edges 62, 64, and 66 are straight, then the opening 72 is in the shape of a slot.

The angle 68 on the third blade member 16 is biased in the direction of the opening 72 in the first or second blade member 12, 14. Viewed in FIG. 3, the angle 68 of the cutting edge 66 of the third blade member 16 is biased in the direction of the opening 72 in the first blade member 12. In this arrangement, the opening 72 in the second blade member 14 may be dispensed with since the swarf will exit through the hole 72 in the first blade member 12.

At least the first or second blade member 12, 14 which is provided with the opening 72 through which the swarf will exit has a counter sunk clearance cut-away portion 74, on the outside face 60 thereof which extends from the opening 72 to its cutting edge 62, 64. In FIG. 2, this is best seen in relation to the first blade member 12.

The cut-away portion 74 slopes from the cutting edge 62 (or 64) to the opening 72 such that the first or second blade member 12 (or 14) is thinner near the opening 72 than at its cutting edge 62 (or 64).

The cutting tool 10 is also provided with a spring 76 to bias the handles 18 and 50 apart. One end 78 of the spring 76 locates in a hole 80 in the handle 18. The other end 82 of the spring 76 abuts against the third blade member 16.

Figure 6:
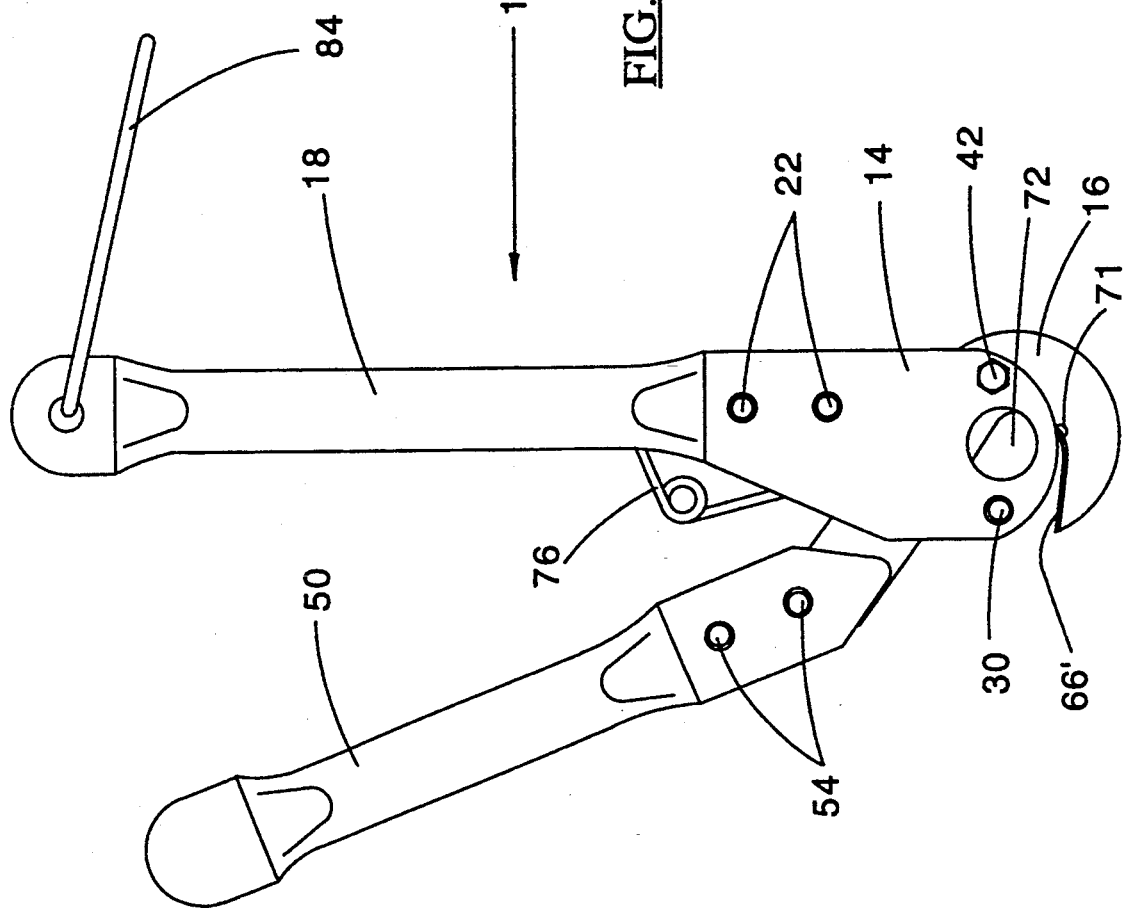
FIG. 6 is a side elevation view of the cutting tool shown in FIG. 5.
Figure 5:
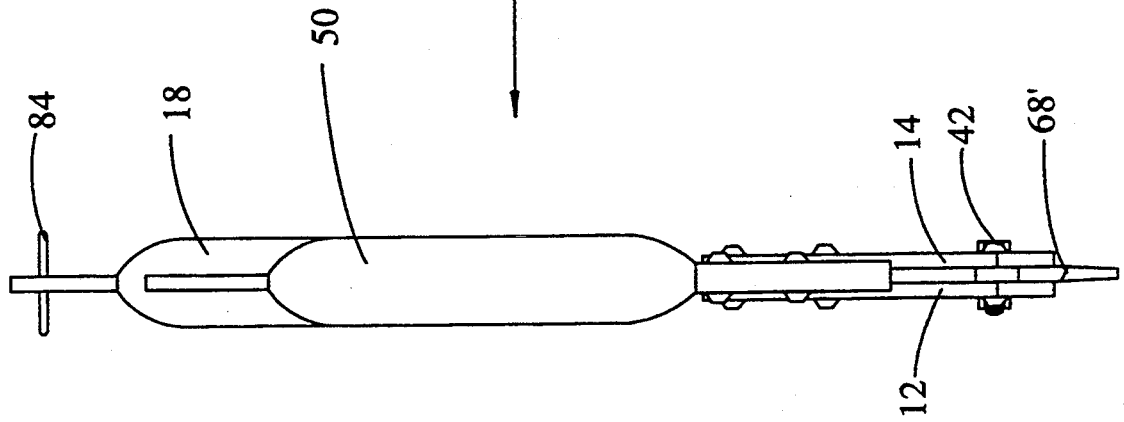
FIG. 5 is a front elevation view of a second embodiment of a cutting tool in accordance with the present invention.

The cutting tool 10 may also be provided with a clip 84 to keep the handles 18 and 50 close together when the cutting tool 10 is not in use. The clip 84 may be swivellably held in a hole 86 in the end of the handle 18. The clip 84 overcomes the biasing action of the spring 76. When the handles 18 and 50 are held by the clip 84, the cutting edge 66 of the third blade member 16 is hidden between the first and second blade members 12 and 14. The angle 68 on the cutting edge 66 of the third blade member 16 may be provided in the other direction. This is illustrated in FIGS. 5 and 6 which depict a second embodiment of a cutting tool 10'. This different direction of the angle is shown at reference numeral 68' in FIG. 5. In such a case, the opening 72 through which the swarf will exit is provided in the second blade number 14. The cutting tool 10' of the second embodiment is otherwise the same as the cutting tool 10 of the first embodiment hereinbefore described.

The first, second and third cutting blade members 12, 14 and 16 may be made of any steel suitable for hardening and can be pressed out in a press tool and then hardened and the cutting edges 62, 64 and 66 ground. The handles 18 and 50 may be made from mild steel tubing flattened at its ends to accommodate assembly of the cutting tool 10. The spacing pin 30 may be pressed out in a press tool. The pivot pin 42 may be turned on a lathe from steel suitable for hardening, then hardened. The spring 76 may be made from spring steel and formed in a press tool. The cutting tool 10 may be assembled and fastened together with mild steel rivets 22 and 54. The spring 76 is fitted at assembly between the third blade member 16 and handle 18.

The manner and operation of the cutting tool 10' of the present invention will now be described with particular reference to FIGS. 7a, 7b and 7c.

In FIGS. 7a, 7b and 7c there is shown a piece of corrugated sheet material 100 in the process of being cut by the cutting tool 10'.

The curved cutting edges 62, 64 and 66 of the first, second and third blade members 12, 14 and 16, respectively, enable the cutting tool 10' to be used to cut corrugated sheet material.

The sheet material 100 is engaged between the first and second blade members 12 and 14 and the third blade member 16. The first and second blade members 12 and 14 locate on material.

The sheet material 100 is engaged between the first and second blade members 12 and 14 and the third blade member 16. The first and second blade members 12 and 14 locate on the upper side of the sheet material 100 and the third blade member 16 on the underside. The handles 18 and 50 are then squeezed toward one another against the biasing action of the spring 76. As the handles 18 and 50 are brought toward one another in this manner, the cutting edge 66 of the third blade member 16 moves toward the cutting edges 62 and 64 of the first and second blade members 12 and 14, and the sheet material 100 is cut by the first and second blade members 12 and 14 and the third blade member 16 at an initial cutting zone. When the handles 18 and 50 come to the limit of their travel toward one another, the handles 18 and 50 are released by the operator and the spring 76 will bias the handles 18 and 50 to their spaced apart condition as shown in FIGS. 7a–7c. In this condition, the third blade member 16 is spaced from the first and second blade members 12 and 14 as shown in FIGS. 7a–7c. The cutting tool 10 is then advanced into the cut made in the sheet material 100 so that a further portion thereof engages between the first and second blade members 12 and 14 and the third blade member 16. The handles 18 and 50 are then again brought together to cut a further portion of the material 100 at a second cutting zone. This action is repeated to cut the sheet material 100 as required.

As the sheet material 100 is cut between the first and second blade members 12 and 14 and the third blade member 16, a thin ribbon of swarf 102 is cut from the sheet material 100. The angle 68' on the cutting edge 66 of the third blade member 16 directs the swarf 102 in the direction of the appropriate opening 72 in the second blade member 14. This angle 68' on the cutting edge 66 of the third blade member 16 also reduces the projected area of this swarf 102 by twisting it slightly along its axis thereby making it narrower than the distance between the opposing first and second blade members 12 and 14. This allows a smoother passage of the swarf 102 between the first and second blade members 12 and 14 and out through the opening 72.

As previously hereinbefore described, the curvatures of the cutting edges 62, 64 and 66 of the first, second and third blade members 12, 14 and 16, respectively, produce a cutting action with a constant cutting angle between the cutting edges 66 and 62, 64 of the third blade member 16 and the first and second blade members 12 and 14, respectively. As a result, the swarf 102 is directed through the same location in the opening 72 during every stage of the cutting action. This enables the opening 72 to be circular and as small as possible thereby keeping maximum strength in the cutting tool 10' in the vulnerable areas close to the cutting edges 62/64.

The provision of the counter sunk clearance cutaway portion 74 assists the swarf 102 to exit through the opening 72 by preventing binding and bunching up of the swarf 102. The swarf 102 exits the opening 72 and takes the form of a continuous strip of helical material as the cutting tool 10' is advanced through the sheet material 100 in the direction of the cut.

The swarf 102 exits the opening 72 and is turned away from the cutting zone in a direction substantially sideways i.e. transverse to the cutting direction. This can be seen in FIGS. 7a–7c where the direction of the cut is in the plane of the drawing sheet in the direction from right to lea. The swarf 102 exits the opening 72 in the second blade member 14 and extends in a direction coming out of the plane of the drawing sheet. In this way, the swarf 102 is discharged away from the cutting zone as it exits from the opening so as not to interfere with the further cutting operation.

The cutting tool 10 of the first embodiment operates in a similar manner except that the swarf 102 exits through the opening 72 in the first blade member 12 since the angle 68 on the cutting edge 66 of the third blade member 16 is angled in the opposite direction. The cutting tool 10/10' of the present invention enables corrugated sheet material to be cut to any length and shape without distortion of the original profile of the corrugated sheet material and without the handles 18, 50 of the cutting tool 10/10' ever interfering with the corrugated sheet material.

The cutting tool 10/10' of the present invention is not restricted to an exact cutting angle on the concave curved cutting edge 66 of the third blade member 16, but may vary provided that the swarf 102 is directed through the opening 72 in the first and or second blade member 12, 14.

Further, the cutting tool 10/10' of the present invention is not restricted to the form of curves of the cutting edges 62, 64 and 66 of the first, second and third blade members 12, 14, 16 shown in the embodiments but may vary using curves or multiple-flat edge shapes of any suitable type to produce a constant cutting angle between the cutting edges 62, 64 and 66 on the first and second blade members 12 and 14 and the third blade member 16. The provision of the curved cutting edges 62, 64 and 66 on the first, second and third blade members 12, 14 and 16 on the cutting tool 10/10' of the present invention produces a curing action suitable for cutting internal and external curves and straight lines across the corrugations of corrugated sheeting of both curved and angular profiles in steel and plastics materials.

The cutting tool of the present invention may, as an alternative be provided with straight (as opposed to curved) cutting edges 62, 64 and 66 on the first, second and third blade members 12, 14 and 16. However, straight cutting edges 62, 64 and 66 would not be suitable for cutting corrugated sheeting across the corrugations of the corrugated sheeting.

Whilst the cutting tool of the present invention has been herein described with reference to embodiments in which the cutting tool is hand operated, the present invention may be incorporated into a power cutting tool.

Modifications and variations such as would be apparent to a skilled addressee are deemed to be within the scope of the present invention.

We claim:

1. A cutting tool comprising first, second, and third blade members, said third blade member provided between said first and second blade members and pivotal relative to said first and second blade members, and means for discharging swarf removed from material cut during a cutting operation, wherein said means for discharging swarf discharges said swarf away from the cutting zone in a direction substantially transverse to the cutting direction and said means for discharging swarf comprises an exit opening provided in at least one of said first and second blade members and an angle on the cutting edge of said third blade member, said angle biased toward said exit opening such that said swarf is directed through said exit opening.

2. A cutting tool according to claim 1, wherein said first and second blade members are provided with convex cutting edges and said third blade member is provided with a concave cutting edge, such that the angle between the convex cutting edges of said first and second blade members and the concave cutting edge of said third blade member when said blade members perform a cut of said material is kept constant.

3. A cutting tool according to claim 1, wherein a notch is provided on each side of said third blade member at the start of its cutting edge spaced from its tip.

4. A cutting tool according to claim 1, wherein said third blade member tapers from its cutting edge to its outer edge.

5. A cutting tool according to claim 1, wherein a first handle is attached to said first and second blade members and a second handle is attached to said third blade member.

6. A cutting tool according to claim 1, wherein at least said one of said first and second blade members provided with said exit opening is provided with a cut-away portion on the inside face thereof between said exit opening and the cutting edge of said one first or second blade member to assist said swarf to exit through said exit opening.

7. A cutting tool according to claim 5, wherein spring means is provided to bias said first and second handles apart.

8. A cutting tool according to claim 5, wherein said first handle is provided with a portion intermediate said first and second blade members, a spacing pin means is provided between said first and second blade members and said third blade member is pivotal relative to said first and second blade members via a pivot pin such that the spacing between said first and second blade members is maintained by said portion of said first handle, said spacing pin means and said pivot pin.

9. A cutting tool according to claim 8, wherein said spacing pin means is provided near a first end of the cutting edges of said first and second blade members and said pivot pin is provided at a second end of said cutting edges spaced from said first end.

* * * * *